US012192704B2

(12) United States Patent
Parker

(10) Patent No.: US 12,192,704 B2
(45) Date of Patent: Jan. 7, 2025

(54) MICROELECTROMECHANICAL SYSTEM MICROPHONE ARRAY CAPSULE

(71) Applicant: INVENSENSE, INC., San Jose, CA (US)

(72) Inventor: Jeremy Parker, Chelmsford, MA (US)

(73) Assignee: INVENSENSE, INC., San Jose, CA (US)

( * ) Notice: Subject to any disclaimer, the term of this patent is extended or adjusted under 35 U.S.C. 154(b) by 217 days.

(21) Appl. No.: 18/063,374

(22) Filed: Dec. 8, 2022

(65) Prior Publication Data

US 2023/0188904 A1 Jun. 15, 2023

Related U.S. Application Data

(60) Provisional application No. 63/289,165, filed on Dec. 14, 2021.

(51) Int. Cl.
*H04R 19/04* (2006.01)

(52) U.S. Cl.
CPC ....... *H04R 19/04* (2013.01); *H04R 2201/003* (2013.01)

(58) Field of Classification Search
CPC .......................... H04R 19/04; H04R 2201/003
USPC .......................................................... 381/174
See application file for complete search history.

(56) References Cited

U.S. PATENT DOCUMENTS

| | | | |
|---|---|---|---|
| 9,693,169 B1 | 6/2017 | Carlsson et al. | |
| 10,601,385 B2 | 3/2020 | Moberg et al. | |
| 2004/0096072 A1 | 5/2004 | Orten | |
| 2009/0180643 A1 | 7/2009 | Sander et al. | |
| 2011/0003614 A1 | 1/2011 | Langereis et al. | |
| 2016/0090293 A1 | 3/2016 | Oliaei | |
| 2016/0097855 A1 | 4/2016 | Qutub et al. | |
| 2017/0214994 A1 | 7/2017 | Gadonniex et al. | |
| 2019/0301956 A1* | 10/2019 | Tanaka | H04R 31/003 |
| 2019/0369236 A1 | 12/2019 | Rusconi et al. | |
| 2021/0014600 A1 | 1/2021 | Neumaier et al. | |
| 2021/0017016 A1 | 1/2021 | Anzinger et al. | |
| 2021/0127202 A1* | 4/2021 | Ayazi | G01H 11/00 |
| 2022/0224300 A1 | 7/2022 | Knode | |

OTHER PUBLICATIONS

Qin et al. "ProxiMic: Convenient Voice Activation via Close-to-Mic Speech Detected by a Single Microphone" CHI '21: Proceedings of the 2021 CHI Conference on Human Factors in Computing Systems, May 2021, Article No. 8, pp. 1-12, https://dl.acm.org/doi/10.1145/3411764.3445687, 12 pages.

(Continued)

*Primary Examiner* — Sean H Nguyen
(74) *Attorney, Agent, or Firm* — Amin, Turocy & Watson, LLP

(57) ABSTRACT

The present invention relates to a microelectromechanical system (MEMS) microphone array capsule. In one embodiment, a MEMS microphone includes a MEMS microphone die; an acoustic sensor array formed into the MEMS microphone die, the acoustic sensor array comprising a plurality of MEMS acoustic sensor elements, wherein respective ones of the plurality of MEMS acoustic sensor elements are tuned to different resonant frequencies; and an interconnect that electrically couples the acoustic sensor array to an impedance converter circuit.

20 Claims, 8 Drawing Sheets

(56) References Cited

OTHER PUBLICATIONS

Infineon "Xensiv™ MEMS microphone with 67 dB(A) SNR and ultrasonicreceiving/sending capabilities" Infineon Technologies AG, Munich German, Nov. 2021, 5 pages.
International Search Report and Written Opinion received for PCT Application Serial No. PCT/US2023/028946 dated Nov. 27, 2023, 15 pages.

* cited by examiner

MICROELECTROMECHANICAL SYSTEM MICROPHONE ARRAY CAPSULE

RELATED APPLICATIONS

The present application claims the benefit of priority to U.S. Provisional Patent Application No. 63/289,165, filed Dec. 14, 2021, and entitled "MEMS MIC ARRAY CAPSULE," the entirety of which application is incorporated herein by reference.

TECHNICAL FIELD

The subject disclosure generally relates to microelectromechanical system (MEMS) devices, and more particularly to MEMS microphones.

BACKGROUND

MEMS microphones are generally small devices, e.g., on the order of millimeters in all dimensions, and can be integrated with printed circuit boards (PCBs) and/or other components of an electronic device. Because of these properties, MEMS microphones are widely used in small form-factor devices such as mobile phones, Internet of Things (IoT) devices, or the like. However, compared to the demands of professional audio applications, current MEMS microphones exhibit relatively low signal-to-noise ratio (SNR), a low acoustic overload point (AOP), and ultrasonic overload issues due to the high-amplitude resonance of their frequency response. It is therefore desirable to implement structures and/or techniques to improve the performance of MEMS microphones with respect to these and/or other metrics.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
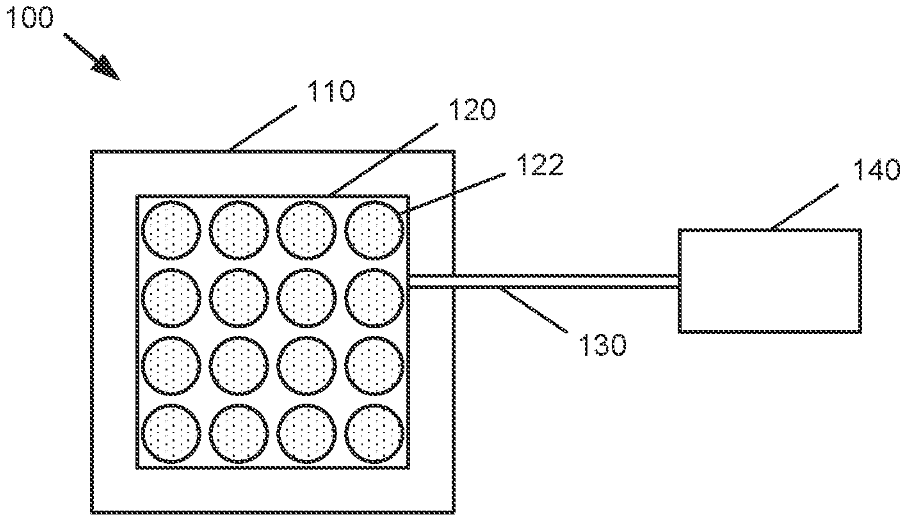
FIG. 1 is a diagram of an example MEMS microphone in accordance with various embodiments of the disclosure.

One or more aspects of the present disclosure are generally directed toward MEMS microphones and corresponding methods of use and/or manufacture. As noted above, existing MEMS microphones are limited in performance by the size, packaging, and electronics constraints established by existing consumer electronics technology. For instance, performance of existing MEMS microphones (e.g., in terms of acoustic response, SNR, or other factors) is generally limited by small sound port size, and these limitations can be exacerbated by placing the microphone onto a PCB or other surface with a further opening corresponding to the location of the sound port. To compensate for this loss in SNR, damping is often removed from the MEMS structure, e.g., by placing the structure in a vacuum to remove viscous losses due to air, and/or by other techniques. However, these techniques can result in a significantly underdamped structure, which can result in an undesirable frequency response with a high-Q (quality factor) resonant peak. This, in turn, can lower the AOP of the microphone in the high frequency region as well as degrade signal fidelity. These and/or other limitations of existing MEMS microphones have prevented the use of MEMS microphones for use cases requiring higher electro-acoustic performance, such as professional studio microphones or the like.

In view of at least the above, various aspects of MEMS microphones are described herein that can improve overall device performance and improve the suitability of MEMS microphones for professional audio applications and/or other similar uses. For instance, a MEMS microphone as described herein can utilize one or more of an array of MEMS microphone structures of reduced total acoustic resistance on a single die, an enlarged sound port that does not form a resonant cavity and does not cause negative acoustic effects associated with having a small and narrow sound port, electrical components that interface with the MEMS that can buffer an acoustic signal with reduced noise and a sufficiently large output voltage swing to capture a full dynamic range, and/or an interconnect method in a capsule package that is suitable for acoustic integration into professional microphones.

Various aspects as described herein can simultaneously address MEMS noise and frequency response (e.g., via higher damping, a larger array to reduce total acoustic resistance, etc.), appropriate circuitry to accept the full dynamic range of the MEMS (e.g., via a junction-gate field-effect transistor (JFET), application-specific integrated circuit (ASIC), and/or other discrete components), and packaging that can eliminate the typical small sound port and front cavity resonance while enabling extended back volumes and/or a rear acoustic path that can be used by a directional microphone application. Additionally, the capsule can be assembled in such a way as to prevent reflow soldering in the vicinity of the MEMS, thus preventing contamination and/or flux ingress. Further, the associated MEMS array can present a larger active capacitance than conventional MEMS arrays, which can enable reduction of ASIC noise and/or provide for easy integration into discrete component impedance converters such as JFET buffer circuitry. Moreover, the size of the MEMS array can be scaled to achieve any desired SNR/capacitance, with no change in sensitivity or bandwidth, in contrast to traditional microphone designs.

In one aspect disclosed herein, a MEMS microphone includes a MEMS microphone die, an acoustic sensor array formed into the MEMS microphone die, and an interconnect that electrically couples the acoustic sensor array to an impedance converter circuit. The acoustic sensor array can include MEMS acoustic sensor elements, and respective ones of the MEMS acoustic sensor elements can be tuned to different resonant frequencies.

In another aspect disclosed herein, another MEMS microphone can include a housing assembly with a first opening, of a first size, formed into a surface of the housing assembly. The MEMS microphone can also include a sensor layer, situated parallel to the surface of the housing assembly and hermetically sealed to an interior of the housing assembly, that includes a MEMS acoustic sensor array having a second size that is no greater than the first size. The MEMS microphone can further include a connector layer removably coupled to the sensor layer at a defined distance from the sensor layer, resulting in a gap between the sensor layer and the connector layer, where the connector layer is situated parallel to the sensor layer and hermetically sealed to the interior of the housing assembly. The MEMS microphone can additionally include a second opening formed into the housing assembly that exposes the gap between the sensor layer and the connector layer to an environment.

In an additional aspect disclosed herein, still another MEMS microphone can include a circuit board having an opening of a first size located at a position relative to the circuit board and a MEMS microphone array, of the first size, situated within the opening of the circuit board. The MEMS microphone can further include a housing that encapsulates the circuit board and the MEMS microphone array, where the housing includes a port aperture, of a second size that is no smaller than the first size and formed into the housing at the position relative to the circuit board, resulting in a first surface of the MEMS microphone array being exposed to an environment. The MEMS microphone can also include a backing platform removably coupled to a second surface of the circuit board that is opposite the first surface of the MEMS microphone array, where the housing further encapsulates the backing platform.

Other embodiments and various examples, scenarios and implementations are described in more detail below. The following description and the drawings set forth certain illustrative embodiments of the specification. These embodiments are indicative, however, of but a few of the various ways in which the principles of the specification may be employed. Other advantages and novel features of the embodiments described will become apparent from the following description when considered in conjunction with the drawings.

With reference now to the drawings, various views of example MEMS microphone components are provided. It is noted that the drawings are not drawn to scale, either within a single drawing or between different drawings.

Turning first to FIG. 1, a simplified diagram of an example MEMS microphone 100 is illustrated. More particularly, FIG. 1 illustrates respective components of a MEMS microphone, such as sensor elements and related circuitry, in a simplified and generic manner. It is noted that similar components and concepts to those shown in FIG. 1 could also be applied to various other example implementations, e.g., as will be described in further detail below.

As shown in FIG. 1, the MEMS microphone 100 can include a MEMS microphone die 110 into which an acoustic sensor array 120 can be formed. The acoustic sensor array 120 is composed of a group of MEMS acoustic sensor elements 122, which can operate together to produce an electrical signal in response to an input audio signal. In an implementation, the microphone die 110, the acoustic sensor array 120, and/or the acoustic sensor elements 122 can be implemented via one or more semiconductor chips. Other implementations are also possible.

In an embodiment, each of the acoustic sensor elements 122 can be implemented as an individual MEMS acoustic sensor, e.g., with independent components. For instance, each of the acoustic sensor elements 122 shown in FIG. 1 can include a backplate that, together with a membrane, forms a variable capacitor. As known by those skilled in the art, the variable capacitor can produce electrical signals representing input acoustic signals incident on the membrane. Electrical signals from each of the acoustic sensor elements 122 can then be tied together, or otherwise combined, for further processing as described below.

In another embodiment, the membrane of an acoustic sensor element 122 can be deposited onto, and/or otherwise coupled with, other portions of the acoustic sensor element 122, such as a backplate, a substrate, or the like. Depending on implementation, a substrate can be positioned on either side of the backplate relative to the membrane. Thus, for example, the substrate could be positioned between the backplate and the membrane (forming a membrane-substrate-backplate stack), or alternatively the substrate could be positioned opposite the membrane (forming a membrane-backplate-substrate stack).

In general, the number of acoustic sensor elements 122 present in the acoustic sensor array 120 shown in FIG. 1 can be larger than that associated with conventional MEMS microphone arrays. While a 4×4 array is illustrated in FIG. 1, other sizes could also be used, e.g., 5×5, 6×6, etc. Additionally, the acoustic sensor elements 122 of the acoustic sensor array 120 can be detuned to each other, e.g., such that each of the acoustic sensor elements 122 are tuned to different resonant frequencies. This detuning can be the result of tolerances associated with the manufacturing process of the acoustic sensor elements 122, or alternatively the acoustic sensor elements 122 can be designed and/or built with purposeful variation between the structures of the acoustic sensor elements 122 to facilitate the difference in resonant frequencies. In the latter case, the difference between resonant frequencies of the acoustic sensor elements 122 can exceed a range associated with tolerances, i.e., such that the resonant frequencies of the acoustic sensor elements 122 ranges from an upper resonant frequency and a lower resonant frequency, and a difference between the upper and lower resonant frequencies is larger than a frequency tolerance associated with the acoustic sensor elements 122.

As a result of the variance in resonant frequencies between the respective acoustic sensor elements 122 of the acoustic sensor array 120 as described above, the resonant peak of the frequency response associated with the MEMS microphone 100 can be reduced, e.g., due to interactions between the individual resonant peaks of the respective acoustic sensor elements 122. This, in turn, can improve the flatness of the frequency response of the MEMS microphone 100, e.g., by reducing the resultant overall Q of the frequency response, in a manner that grants the effect of additional backplate resistance without increasing the actual backplate resistance.

Additionally, the comparatively large number of acoustic sensor elements 122 in the acoustic sensor array 120 can increase the SNR of the acoustic sensor array 120 independently of the damping of the individual acoustic sensor elements 122. As a result, the acoustic sensor elements 122 can be damped according to a damping ratio that is higher than that of conventional MEMS acoustic sensors, such as a critically damped damping ratio, an overdamped damping ratio, or a minimally underdamped damping ratio, to improve the bandwidth of the MEMS microphone 100 with any resulting SNR losses being offset by the number of acoustic sensor elements 122. As a result, various implementations of the MEMS microphone 100 can result in both high SNR commonly associated with conventional high-performance microphones and high bandwidth commonly associated with smaller MEMS microphones.

As further shown in FIG. 1, the MEMS microphone 100 can include an interconnect 130 (e.g., a wire or wirebond, solder pad, etc.) that electrically couples the acoustic sensor array 120 to processing circuitry, such as an impedance converter circuit 140. The impedance converter circuit 140 can be an ASIC and/or other suitable circuitry that can perform, and/or facilitate the performance of, various operations on the electrical signal generated by the acoustic sensor array 120. These operations can include, e.g., signal buffering, bias voltage supply, analog to digital conversion for a digital microphone, and/or other operations.

In an embodiment, the number of acoustic sensor elements 122 in the acoustic sensor array 120 can result in an output capacitance of the acoustic sensor array 120 being larger than that of conventional MEMS acoustic sensors (e.g., an output capacitance of approximately 40 pF, compared to an output capacitance of approximately 1 pF for a conventional MEMS microphone). As a result, a JFET can be utilized as a front end for the impedance converter circuit 140. Because the output capacitance of the acoustic sensor array 120 is larger than the input capacitance of a typical JFET (e.g., approximately 4 pF), the acoustic sensor array 120 can interface with a JFET front end without significant signal attenuation.

Figure 2:
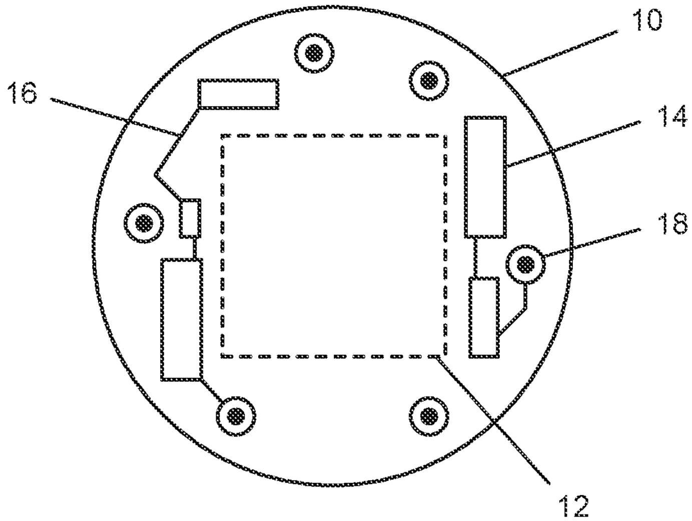
FIG. 2 is a diagram depicting a top perspective view of an example sensor layer for a MEMS microphone in accordance with various embodiments of the disclosure.
Figure 3:
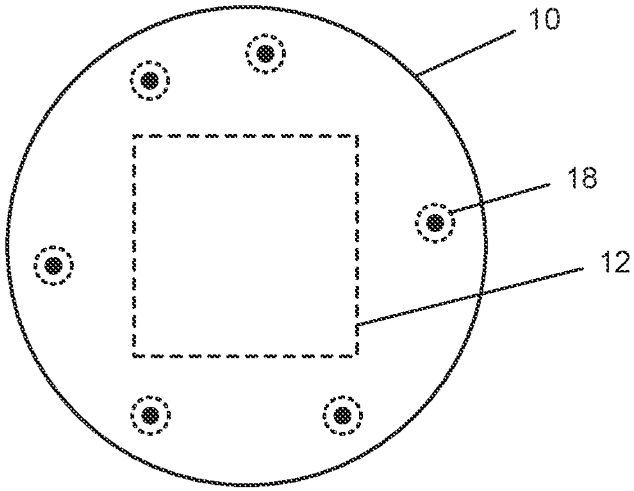
FIG. 3 is a diagram depicting a bottom perspective view of the sensor layer shown in FIG. 2.
Figure 4:
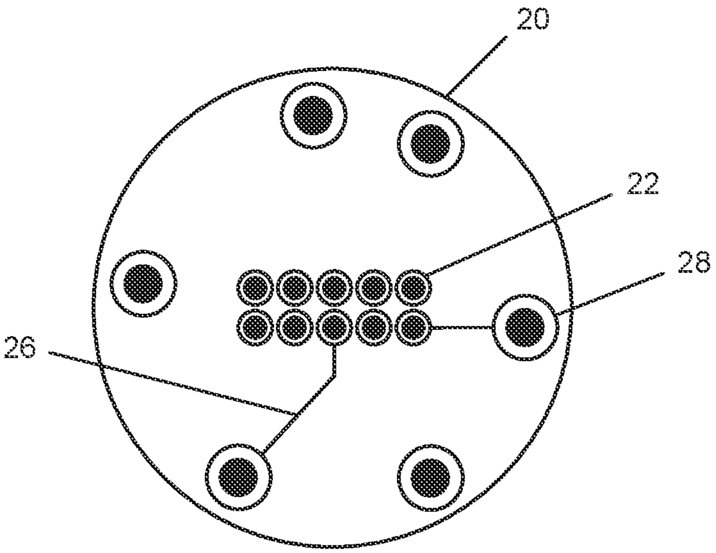
FIG. 4 is a diagram depicting a top perspective view of an example connector layer for a MEMS microphone in accordance with various embodiments of the disclosure.
Figure 5:
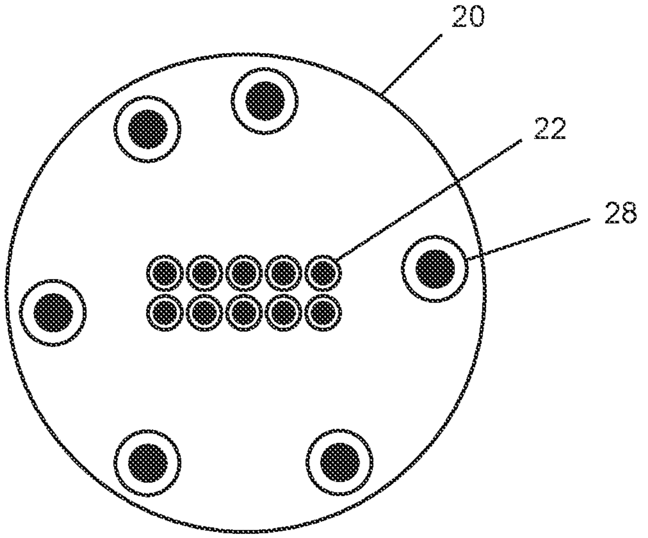
FIG. 5 is a diagram depicting a bottom perspective view of the connector layer shown in FIG. 4.
Figure 6:
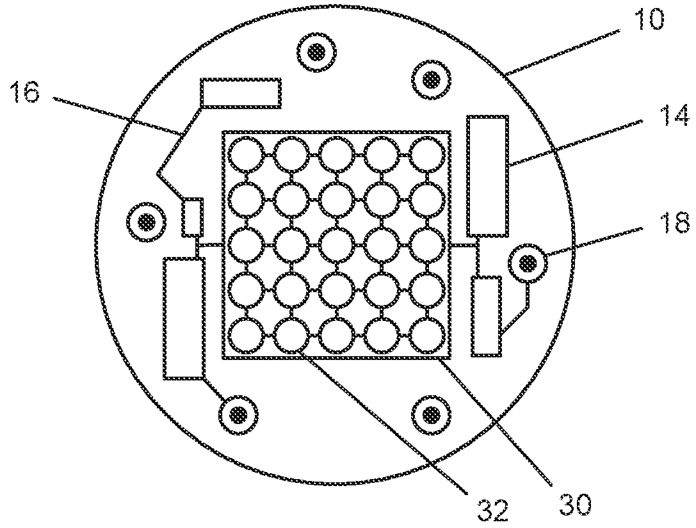
FIG. 6 is a diagram depicting a top perspective view of an example implementation of a MEMS microphone array within the sensor layer shown in FIG. 2.
Figure 7:
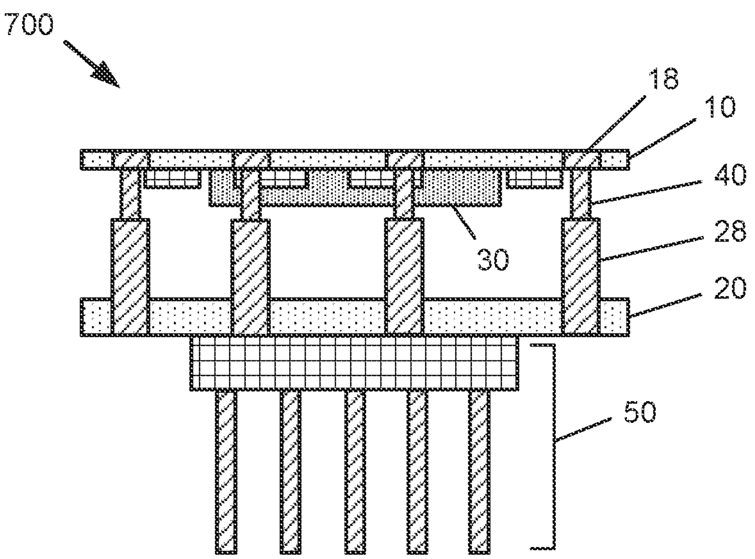
FIG. 7 is a diagram depicting a cross-sectional view of an example MEMS microphone capsule assembly in accordance with various embodiments of the disclosure.

With reference next to FIGS. 2-7, respective components of an example MEMS microphone that can operate as described above with respect to FIG. 1 are illustrated. More particularly, FIGS. 2-3 show top and bottom perspective views, respectively, of an example sensor layer 10, FIGS. 4-5 show top and bottom perspective views, respectively, of an example connector layer 20, FIG. 6 shows a top perspective view of the example sensor layer 10 integrated with a MEMS acoustic sensor array 30, and FIG. 7 is a cross-sectional view of a MEMS microphone capsule assembly that incorporates the sensor layer 10 and the connector layer 20. While FIGS. 2-7 have been drawn to maintain relative consistency between the respective illustrated elements, it is noted that the consistency and/or scale of elements shown in FIGS. 2-7 may be altered between the respective drawings in some cases where appropriate for purposes of illustration.

Referring now to FIG. 2, the illustrated sensor layer 10 is a substantially circular (e.g., circular or near circular) layer of a solid material, such as a PCB or other laminate board. A circular shape for the sensor layer 10 as shown in FIG. 2 can be utilized to create an overall form factor that is similar to that of traditional microphone capsules, e.g., in order to facilitate the implementation of the MEMS microphone capsule described herein in place of a traditional microphone capsule with minimal product design changes.

The sensor layer 10 shown in FIG. 2 includes an opening 12 into which a MEMS microphone array can be situated, e.g., as will be described below with respect to FIGS. 6-7. While the opening 12 shown in FIG. 2 is a square opening positioned substantially in the center of the sensor layer 10, it is noted that the opening could be of any suitable shape or size, and in any suitable position, suitable for integration of a MEMS microphone array.

The sensor layer further includes suitable processing circuitry 14, such as JFETs, ASICs, and/or other circuit components operable to process electrical signals produced by an acoustic sensor situated within the opening 12 of the sensor layer 10. The sensor layer 10 shown in FIG. 2 also includes interconnects 16, e.g., wirebonds, that can electrically couple respective elements of the processing circuitry 14 to each other. Additionally, the interconnects 16 can be utilized to electrically couple signals associated with the sensor layer to other layers of the microphone capsule, e.g., via through holes 18 that can be utilized to physically and electrically connect the sensor layer 10 to other components, such as a connector layer 20 as will be described in further detail with respect to FIGS. 4-5 below. For instance, the through holes 18 can be configured with shapes and/or sizes to facilitate the placement of post connector (PC) pins, or other physical and electrical connectors, into the through holes 18.

In an embodiment, the through holes 18 can have a plated outer ring that can serve as a guide for PC pins and/or other connectors placed into the through holes 18, enhance an electrical coupling between the sensor layer 10 and attached connectors, etc. As further shown by the bottom perspective view of the sensor layer 10 in FIG. 3, plating of the through holes 18 can be limited, wholly or in part, to the top (front) side of the sensor layer 10.

Turning next to FIG. 4, an example connector layer 20 for a MEMS microphone capsule can have a similar shape as the sensor layer 10, e.g., a substantially circular shape, to facilitate consistency with the sensor layer 10. In some embodiments the connector layer 20 can have a similar material composition to the sensor layer 10, e.g., a PCB or other laminate board, or other materials could be used for the connector layer 20 as appropriate.

As further shown in FIG. 4, the connector layer 20 can include respective electrical contacts 22, which can facilitate the coupling of electrical signals from the sensor layer 10, e.g., signals generated by an acoustic sensor array and/or processed by respective processing circuit components, to the connector layer. Similar to the sensor layer 10 shown in FIG. 2, these signals can be coupled to the connector layer 20 via wirebonds and/or other interconnects 26 that run from pin receptacles 28 extending from the top surface of the connector layer 20 to the electrical contacts 22. An example structure of the pin receptacles 28 relative to the connector layer 20 is shown in further detail in FIG. 7, as will be described in further detail below.

On the reverse side of the connector layer 20, as shown by FIG. 5, a connector device, such as an insulation-displacement connector (IDC), can be coupled to the electrical contacts 22 of the connector layer 20 to facilitate transferal of signals produced by the microphone capsule, e.g., via a cable or other medium. While the electrical contacts 22 shown in FIGS. 2-3 are illustrated as consistent in shape and appearance, one or more of the electrical contacts 22, and/or an area around the electrical contacts 22, can be altered in order to facilitate correct orientation of a connector device attached to the electrical contacts 22.

In various embodiments, an IDC or other connector device can be soldered and/or otherwise affixed to the electrical contacts 22 on the reverse side of the connector layer 20. By separating the sensor layer 10 and the connector layer 20 as shown by FIGS. 2-5, the associated microphone capsule can be assembled without solder and/or reflow steps in the proximity of the MEMS array, which can degrade the electrical performance of the array in some circumstances.

Turning next to FIG. 6, a top perspective view of the sensor layer 10 with an integrated acoustic sensor array 30 is illustrated. In an embodiment, the acoustic sensor array 30 can be placed within an opening of the sensor layer 10, e.g., an opening 12 as shown in FIG. 2 above. As further shown in FIG. 6, the acoustic sensor array 30 includes respective acoustic sensor elements 32, which can operate as described above with respect to FIG. 1. The acoustic sensor elements 32 shown in FIG. 6 are electrically coupled via wirebonds and/or other interconnects to facilitate the conveyance of a combined electrical signal corresponding to each of the acoustic sensor elements 32 of the sensor array 30. As additionally shown by FIG. 6, interconnects 16 (e.g., wire-bonds formed onto the sensor layer 10, etc.) can be situated at one or more sides of the sensor array 30, thereby facilitating the transferal of electrical signals from the sensor array 30 to the processing circuitry 14 of the sensor array, to the connector layer 20 via the through holes 18, and/or to other destinations.

FIG. 7 illustrates a cross-sectional view of an example MEMS microphone capsule 700 that includes a sensor layer 10 and a connector layer 20 as shown and described above with respect to FIGS. 2-6. The sensor layer 10 includes an acoustic sensor array 30, e.g., as described above with respect to FIG. 6. As shown by FIG. 7, the acoustic sensor array 30 can extend through a bottom (with reference to the microphone capsule 700) surface of the sensor layer 10, thereby reducing a front cavity size associated with the microphone capsule 700 and eliminating MEMS front cavity Helmholtz resonance.

The sensor layer 10 and connector layer 20 shown in FIG. 7 are joined together by removable pins 40, e.g., PC pins or the like, that can extend from the pin receptacles 28 of the connector layer 20 to the through holes 18 of the sensor layer 10. By utilizing removable pins 40 to connect the sensor layer 10 and connector layer 20, the microphone capsule 700 can be assembled without applying solder or permanent adhesives joining the two layers 10, 20. This, in turn, can improve the electrical performance of the MEMS array 30 and enable disassembly and servicing of the microphone capsule 700 and/or its component parts. In an embodiment, the pins 40 can also serve as spacer pins to ensure a defined distance between the sensor layer 10 and the connector layer 20, e.g., in proportion to a length of the pins 40.

As additionally shown in FIG. 7, an output connector 50, e.g., an IDC or the like, can be soldered and/or otherwise coupled to a surface of the connector layer 20 that is opposite the sensor layer 10. The output connector can facilitate conveyance of an audio signal, or electrical signals associated with an audio signal, that is produced by the acoustic sensor array 30.

Figure 8:
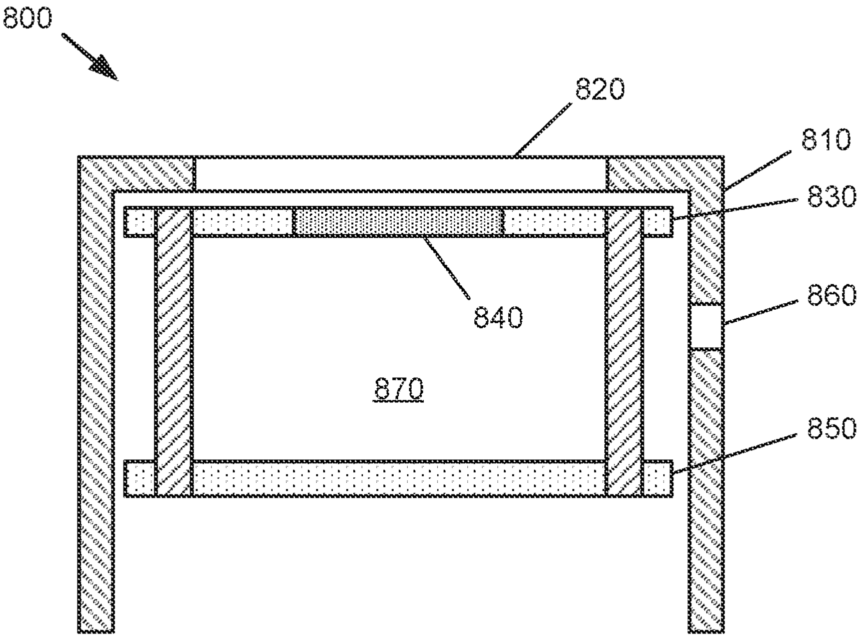
FIG. 8 is a diagram of an example MEMS microphone capsule and packaging in accordance with various embodiments of the disclosure.

Referring now to FIG. 8, a simplified diagram of another example MEMS microphone 800 is illustrated. The MEMS microphone 800 includes a housing assembly 810, which includes an opening 820 of a first size that can be formed into a surface (e.g., a top surface, relative to the MEMS microphone 800) of the housing assembly 810. The MEMS microphone 800 further includes a sensor layer 830 situated parallel to the surface of the housing assembly 810 into which the opening 820 is formed. The sensor layer 830 can be a laminate board, e.g., a PCB or other circuit board, that includes a MEMS sensor array 840 of a second size that is no greater than the first size of the opening 820. While the difference in size between the opening 820 and the MEMS sensor array 840 has been shown in FIG. 8 in an exaggerated manner for purposes of illustration, it is noted that the opening 820 and the MEMS sensor array 840 can be of any suitable sizes, provided that the opening is at least as large (e.g., with respect to edge length, diameter, or other metrics) as the MEMS sensor array 840. In various embodiments, the sensor layer 830 and MEMS sensor array 840 can operate in a similar manner to the sensor layer 10 and sensor array 30 described above with respect to FIGS. 2-7.

The MEMS microphone 800 shown in FIG. 8 further includes a connector layer 850 that is removably coupled to the sensor layer 830 (e.g., via pins 40 and pin receptacles 28 as described above with respect to FIG. 6) at a defined distance from the sensor layer 830, resulting in a gap 870 (i.e., a back cavity volume) between the sensor layer 830 and the connector layer 850. As a result of the connection between the sensor layer 830 and the connector layer 850, the connector layer 850 can be situated parallel to the sensor layer 830. In some embodiments, the connector layer 850 can be a laminate board of similar composition to the sensor layer 830. Alternatively, the connector layer 850 can be composed of any suitable material.

In an embodiment, the sensor layer 830 and/or the connector layer 850 can be hermetically sealed to an interior of the housing assembly 810, e.g., via a dispensed room temperature vulcanization (RTV) seal and/or by other means. By sealing the sensor layer 830 and connector layer 850 to the housing assembly 810, the gap 870 between the sensor layer 830 and connector layer 850 can be closed off from an environment outside the housing assembly 810.

In some embodiments, as further shown by FIG. 8, a second opening 860 can be formed into the housing assembly 810. The second opening 860 can be used to expose the gap 870 between the sensor layer 830 and the connector layer 850 to the environment, which can be used to facilitate directional operation of the microphone 800, e.g., as further described below. Alternatively, the second opening 860 in the housing assembly 810 can be omitted, resulting in a sealed gap 870 to facilitate omnidirectional operation of the microphone 800.

Figure 9:
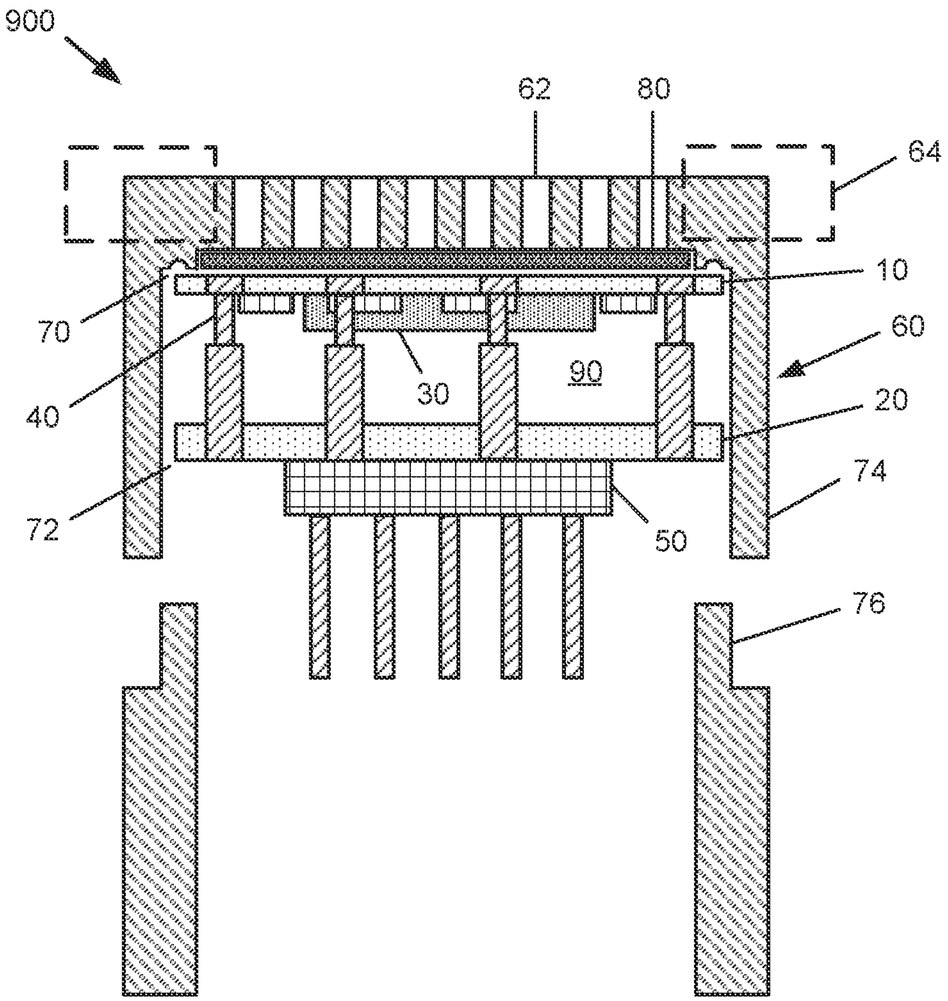
FIGS. 9-10 are diagrams depicting cross-sectional views of respective example enclosed MEMS microphone capsules in accordance with various embodiments of the disclosure.
Figure 10:
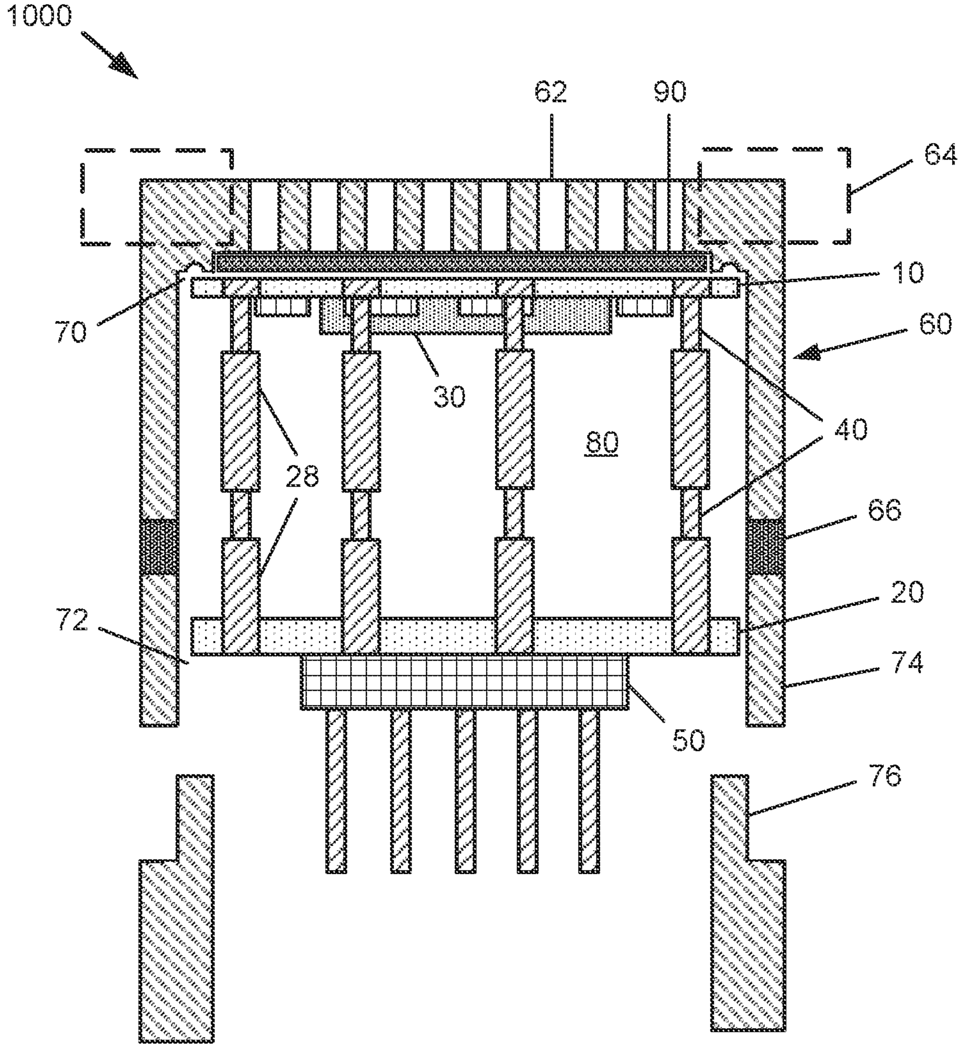

With reference next to FIGS. 9-10, cross-sectional views of respective MEMS microphones 900, 1000 that can utilize the microphone capsule 700 described above with respect to FIG. 7 are illustrated. More particularly, FIG. 9 illustrates an example omnidirectional microphone 900, while FIG. 10 illustrates an example directional (e.g., cardioid, shotgun, etc.) microphone 1000. Other implementations of the microphone capsule 700 described above are also possible.

Turning now to FIG. 9, an example omnidirectional MEMS microphone 900 that can utilize respective embodiments described herein is illustrated. The omnidirectional MEMS microphone 900 shown in FIG. 9 includes a microphone capsule, e.g., composed of a sensor layer 10 and a connector layer 20 that are joined together via pins 40 and pin receptacles 28 in a similar manner to the microphone capsule 700 described above with respect to FIG. 7. As further shown in FIG. 9, a capsule enclosure 60 is placed around the microphone capsule. Respective holes (apertures, openings) 62 are formed into the top surface of the capsule enclosure 60, e.g., a surface of the capsule enclosure 60 that is closest to the sensor layer 10, to enable acoustic input to reach the MEMS sensor array 30 positioned in the sensor layer 10. In an embodiment, the capsule enclosure 60 can further include additional holes 64 formed into a perimeter of the capsule enclosure (indicated via the dotted line regions in FIG. 9) to facilitate a "protection grid" design of the microphone 900. Additionally or alternatively, additional devices, such as a windscreen, can be placed onto the capsule enclosure 60.

As further shown by FIG. 9, the sensor layer 10 and the connector layer 20 can be hermetically sealed to the interior of the capsule enclosure 60 via seals 70, 72, respectively. As described above, the seals 70, 72 can be dispensed RTV seals and/or any other suitable mechanism for sealing a gap 80 between the sensor layer 10 and the connector layer 20 from an environment outside the microphone 900, resulting in the gap 80 between the sensor layer 10 and the connector layer 20 operating as a back volume of the microphone 900. Additionally, the capsule enclosure 60 can include a threaded inner diameter 74 positioned on a bottom portion of the capsule enclosure 60, e.g., a portion of the capsule enclosure 60 opposite the sensor layer 10, to enable the microphone capsule to be attached to a microphone body via a threaded outer diameter 76 of the microphone body.

As additionally shown by FIG. 9, the sensor layer 10 of the microphone 900 can be placed substantially adjacent to the capsule enclosure 60, resulting in the elimination of a front cavity and related front cavity Helmholtz resonance. By eliminating the front cavity, the resonant peak of the frequency response of the MEMS sensor array 30 can be smoothed without altering the configuration of the array 30. In the example shown by FIG. 9, a protection screen 90 formed from a layer of screen material is positioned within the microphone 900 between the surface of the capsule enclosure 60 and the sensor layer 10 such that the protection screen 90 is adjacent to both the capsule enclosure 60 and the sensor layer 10. This can protect the MEMS sensor array 30 from debris and/or other environmental hazards without creating or contributing to a front cavity volume.

Referring now to FIG. 10, an example directional MEMS microphone 1000 that can utilize respective embodiments described herein is illustrated. Repetitive description of like elements described above with respect to FIG. 9 are omitted for brevity. In contrast to the omnidirectional microphone 900 shown in FIG. 9, the directional microphone 1000 has a larger back volume 80 via the use of stacking pins 40 and pin receptacles 28. By increasing the size of the back volume 80 as shown in FIG. 10, noise associated with the microphone packaging can be reduced.

As additionally shown by FIG. 10, perimeter slots 66 can be formed into the sides of the capsule enclosure 60, thereby creating an acoustic delay path through the back volume 80 of the microphone 1000. This, in turn, can enable sound input to reach the reverse side of the MEMS sensor array 30, which can facilitate respective directional pickup patterns (e.g., cardioid, figure-8, shotgun, etc.) by adjusting the properties of the perimeter slots 66 to control a pressure gradient between the front and back sides of the MEMS sensor array 30.

Figure 11:
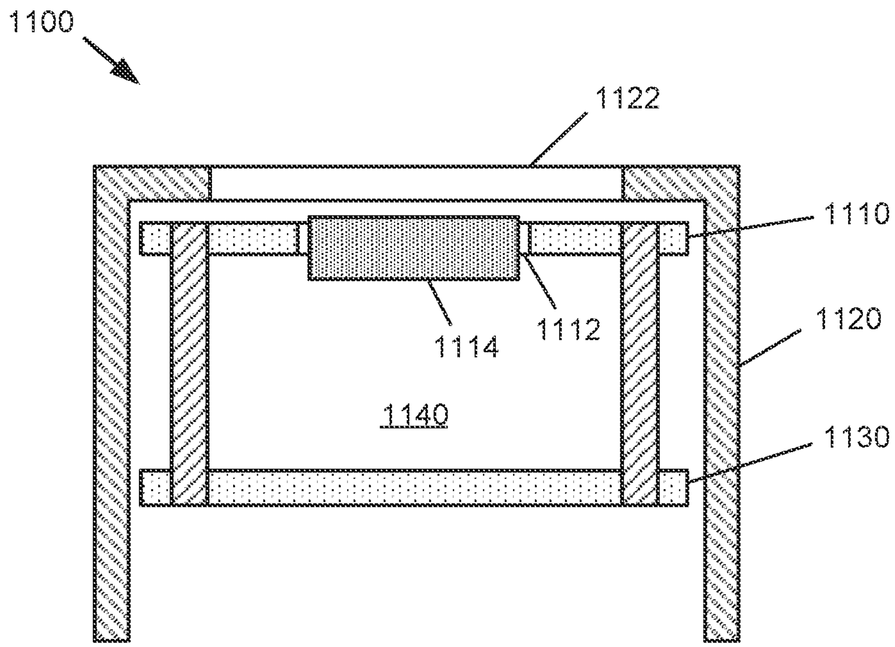
FIG. 11 is a diagram of an example MEMS microphone array, capsule, and enclosure in accordance with various embodiments of the disclosure.

With reference next to FIG. 11, a simplified diagram of a further example MEMS microphone 1100 is illustrated. The MEMS microphone 1100 includes a circuit board 1110 (e.g., a PCB), which has an opening 1112 of a first size located at a position relative to the circuit board 1110, e.g., the center of the circuit board 1110. The MEMS microphone 1100 further includes a MEMS microphone array 1114 of the first size that is situated within the opening 1112 of the circuit board 1110. The opening 1112 is shown in FIG. 11 as larger than the MEMS microphone array 1114 merely for purposes of illustration.

The MEMS microphone 1100 shown in FIG. 11 also includes a housing 1120 that encapsulates the circuit board 1110 and the MEMS microphone array 1114. The housing 1120 includes a port aperture 1122 of a second size that is no smaller than the size of the MEMS microphone array 1114. The port aperture 1122 is formed into the housing 1120 at a position relative to the position of the opening 1112 of the circuit board 1110, resulting in a first (top) surface of the MEMS microphone array 1114 being exposed to the environment.

The MEMS microphone 1100 shown in FIG. 11 further includes a backing platform 1130 (e.g., a PCB or circuit board, and/or a platform of any other suitable material) that is removably coupled to a second (bottom) surface of the circuit board 1110 that is opposite the first (top) surface of the MEMS microphone array. The housing 1120 further encapsulates the backing platform 1130, resulting in a sealed back volume 1140 between the circuit board 1110 and the backing platform 1130.

Figure 12:
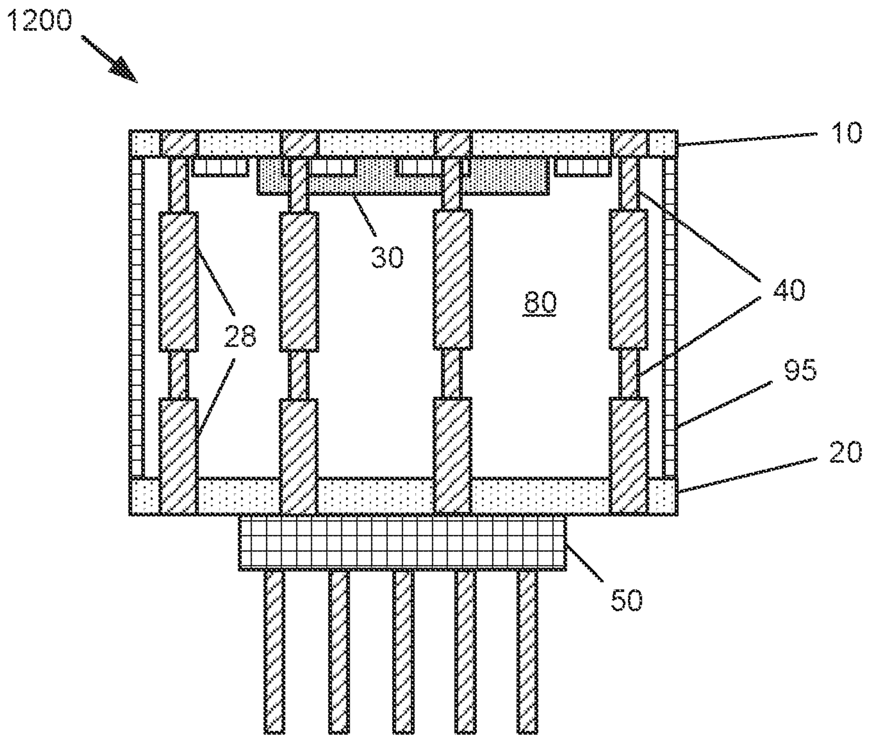
FIG. 12 is a diagram depicting a cross-sectional view of an example partially enclosed MEMS microphone capsule in accordance with various embodiments of the disclosure.

Referring now to FIG. 12, a diagram depicting a cross-sectional view of a MEMS microphone 1200 with a partially enclosed microphone capsule is provided. The MEMS microphone 1200 shown in FIG. 12 can include a microphone capsule that is similar to the capsule of the MEMS microphone 1000 described above with respect to FIG. 10, repetitive description of which is omitted here for brevity. Alternatively, the microphone capsule could be configured in any other suitable manner, e.g., in a similar manner to the capsule of the MEMS microphone 900 described above with respect to FIG. 9.

In contrast to the MEMS microphone 1000 in FIG. 10, which includes a housing 60 that fully encloses the microphone capsule, the sensor layer 10 and connector layer 20 of the MEMS microphone 1200 shown in FIG. 12 themselves partially enclose the gap 80 between the two layers 10, 20. To seal the gap 80 between the two layers 10, 20 from the environment outside the capsule, a spacer 95 can be placed around a perimeter of the capsule between the sensor layer 10 and the connector layer 20. The spacer 95 can be glued and/or otherwise attached to the inner surfaces of the sensor layer 10 and connector layer 20 in order to form an impermeable seal between the spacer 95 and the two layers 10, 20. In various implementations, the spacer 95 can be a ring or other layer of any material suitable for preventing airflow into and out of the gap 80. By enclosing the gap 80 using the sensor layer 10, connector layer 20, and spacer 95 as shown in FIG. 12, the complexity and/or cost of the MEMS microphone 1200 can be reduced.

While the spacer 95 shown in FIG. 12 is a solid layer, e.g., to facilitate omnidirectional operation of the MEMS microphone 1200, it is noted that peripheral openings similar to those described above with respect to FIG. 10 could be formed into the spacer 95 to facilitate directional operation by exposing the rear path of the diaphragms of the sensor array 30. Additionally, while not shown in FIG. 12, an outer (top) surface of the sensor layer 10 could have a metal layer and/or otherwise be fabricated to provide shielding and protection that is similar to the "protection grid" design described above with respect to FIG. 9.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, in the present specification, the term “or” is intended to mean an inclusive “or” rather than an exclusive “or.” That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. Moreover, articles “a” and “an” as used in this specification and annexed drawings should generally be construed to mean “one or more” unless specified otherwise or clear from context to be directed to a singular form.

In addition, the terms “example” and “such as” are utilized herein to mean serving as an instance or illustration. Any embodiment or design described herein as an “example” or referred to in connection with a “such as” clause is not necessarily to be construed as preferred or advantageous over other embodiments or designs. Rather, use of the terms “example” or “such as” is intended to present concepts in a concrete fashion. The terms “first,” “second,” “third,” and so forth, as used in the claims and description, unless otherwise clear by context, is for clarity only and doesn’t necessarily indicate or imply any order in time.

What has been described above includes examples of one or more embodiments of the disclosure. It is, of course, not possible to describe every conceivable combination of components or methodologies for purposes of describing these examples, and it can be recognized that many further combinations and permutations of the present embodiments are possible. Accordingly, the embodiments disclosed and/or claimed herein are intended to embrace all such alterations, modifications and variations that fall within the spirit and scope of the detailed description and the appended claims. Furthermore, to the extent that the term “includes” is used in either the detailed description or the claims, such term is intended to be inclusive in a manner similar to the term “comprising” as “comprising” is interpreted when employed as a transitional word in a claim.

What is claimed is:

1. A microelectromechanical system (MEMS) microphone comprising:

a MEMS microphone die;

an acoustic sensor array formed into the MEMS microphone die, the acoustic sensor array comprising a plurality of MEMS acoustic sensor elements, wherein respective ones of the plurality of MEMS acoustic sensor elements are tuned to different resonant frequencies; and an interconnect that electrically couples the acoustic sensor array to an impedance converter circuit.

2. The MEMS microphone of claim 1, wherein the different resonant frequencies of the respective ones of the plurality of MEMS acoustic sensor elements range from an upper resonant frequency to a lower resonant frequency, and wherein a difference between the upper resonant frequency and the lower resonant frequency is greater than a frequency tolerance associated with the plurality of MEMS acoustic sensor elements.

3. The MEMS microphone of claim 1, wherein the impedance converter circuit comprises a junction-gate field-effect transistor (JFET).

4. The MEMS microphone of claim 3, wherein an output capacitance of the acoustic sensor array is greater than an input capacitance of the JFET.

5. The MEMS microphone of claim 1, wherein each of the plurality of MEMS acoustic sensor elements are damped according to a damping ratio selected from the group consisting of an overdamped damping ratio and a critically damped damping ratio.

6. The MEMS microphone of claim 1, further comprising:

a laminate board having an opening, wherein the MEMS microphone die is positioned within the opening, and wherein the interconnect comprises a wirebond formed onto the laminate board.

7. A microelectromechanical system (MEMS) microphone comprising:

a housing assembly;

a first opening, of a first size, formed into a surface of the housing assembly;

a sensor layer, situated parallel to the surface of the housing assembly and hermetically sealed to an interior of the housing assembly, the sensor layer comprising a MEMS acoustic sensor array having a second size that is no greater than the first size;

a connector layer removably coupled to the sensor layer at a defined distance from the sensor layer, resulting in a gap between the sensor layer and the connector layer, wherein the connector layer is situated parallel to the sensor layer and hermetically sealed to the interior of the housing assembly; and a second opening formed into the housing assembly that exposes the gap between the sensor layer and the connector layer to an environment.

8. The MEMS microphone of claim 7, wherein the surface is a first surface, and wherein the MEMS microphone further comprises:

an output connector coupled to a second surface of the connector layer that is opposite the sensor layer, wherein the output connector facilitates conveyance of an audio signal produced by the MEMS acoustic sensor array.

9. The MEMS microphone of claim 8, wherein the output connector is an insulation-displacement connector.

10. The MEMS microphone of claim 7, further comprising:

a layer of screen material positioned between the surface of the housing assembly and the sensor layer.

11. The MEMS microphone of claim 10, wherein the layer of screen material is adjacent to the surface of the housing assembly and the sensor layer.

12. The MEMS microphone of claim 7, further comprising:

spacer pins that removably couple the sensor layer to the connector layer, the spacer pins having a length that is equal to the defined distance.

13. A microelectromechanical system (MEMS) microphone comprising:

a circuit board having an opening of a first size located at a position relative to the circuit board;

a MEMS microphone array, of the first size, situated within the opening of the circuit board;

a housing that encapsulates the circuit board and the MEMS microphone array, wherein the housing comprises a port aperture, of a second size that is no smaller than the first size and formed into the housing at the position relative to the circuit board, resulting in a first surface of the MEMS microphone array being exposed to an environment; and a backing platform removably coupled to a second surface of the circuit board that is opposite the first surface of the MEMS microphone array, wherein the housing further encapsulates the backing platform.

14. The MEMS microphone of claim 13, wherein the MEMS microphone array comprises a plurality of MEMS acoustic sensor elements, and wherein respective ones of the plurality of MEMS acoustic sensor elements are tuned to different resonant frequencies.

15. The MEMS microphone of claim 13, wherein a third surface of the backing platform is removably connected to the second surface of the circuit board, and wherein the MEMS microphone further comprises:

an output connector coupled to a fourth surface of the backing platform that is opposite the third surface, wherein the output connector facilitates conveyance of an audio signal produced by the MEMS microphone array.

16. The MEMS microphone of claim 13, wherein the circuit board is a first circuit board, and wherein the backing platform is a second circuit board.

17. The MEMS microphone of claim 13, wherein a first perimeter of the circuit board and a second perimeter of the backing platform are hermetically sealed to an interior of the housing, resulting in a back volume bounded by the circuit board, the backing platform, and the housing.

18. The MEMS microphone of claim 17, wherein the housing further comprises at least one perimeter aperture formed into the housing between the circuit board and the backing platform, resulting in the back volume being exposed to the environment.

19. The MEMS microphone of claim 13, further comprising:

an impedance converter circuit situated on the circuit board; and an interconnect that electrically couples the MEMS microphone array to the impedance converter circuit.

20. The MEMS microphone of claim 19, wherein the impedance converter circuit comprises a junction-gate field-effect transistor (JFET).

* * * * *